(12) United States Patent
Sato et al.

(10) Patent No.: US 10,782,251 B2
(45) Date of Patent: Sep. 22, 2020

(54) RADIATION IMAGING APPARATUS, DRIVING METHOD THEREFOR, AND IMAGING SYSTEM

(71) Applicant: CANON KABUSHIKI KAISHA, Tokyo (JP)

(72) Inventors: Sho Sato, Tokyo (JP); Atsushi Iwashita, Tokyo (JP); Kosuke Terui, Yokohama (JP); Yoshiaki Ishii, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 16/045,127

(22) Filed: Jul. 25, 2018

(65) Prior Publication Data
US 2018/0328862 A1 Nov. 15, 2018

Related U.S. Application Data

(63) Continuation of application No. PCT/JP2016/084982, filed on Nov. 25, 2016.

(30) Foreign Application Priority Data

Feb. 10, 2016 (JP) .................. 2016-023980

(51) Int. Cl.
*G01N 23/04* (2018.01)
*H04N 5/341* (2011.01)
(Continued)

(52) U.S. Cl.
CPC ............ *G01N 23/04* (2013.01); *G01T 1/208* (2013.01); *G01T 1/2018* (2013.01); *G01T 1/243* (2013.01);
(Continued)

(58) Field of Classification Search
CPC ....... G01N 23/04; G01T 1/208; G01T 1/2018; G01T 1/247; G01T 1/243; H04N 5/341; H04N 5/32
See application file for complete search history.

(56) References Cited

U.S. PATENT DOCUMENTS

| 9,585,625 B2 * | 3/2017 | Sakai ................. A61B 6/032 |
| 2002/0003904 A1 * | 1/2002 | Shinagawa ............ G06T 9/004 |
| | | 382/236 |

(Continued)

FOREIGN PATENT DOCUMENTS

| JP | 2003-279411 | 10/2003 |
| JP | 2005-167918 | 6/2005 |

(Continued)

*Primary Examiner* — Christine S. Kim
(74) *Attorney, Agent, or Firm* — Venable LLP

(57) ABSTRACT

A radiation imaging apparatus includes a pixel array in which a plurality of pixels are arrayed and a processing unit configured to process pixel signals non-destructively read out from the respective pixels. The processing unit performs a first process of obtaining image data of a plurality of frames by repeatedly reading out image data while the pixel array is irradiated with radiation, with a group of pixel signals from the plurality of pixels corresponding to image data of one frame, and a second process of generating data for a radiation image based on data differences between the image data of the plurality of frames.

10 Claims, 8 Drawing Sheets

(51) Int. Cl.
- *G01T 1/20* (2006.01)
- *G01T 1/24* (2006.01)
- *H04N 5/32* (2006.01)
- *G01T 1/208* (2006.01)

(52) U.S. Cl.
CPC ............... *G01T 1/247* (2013.01); *H04N 5/32* (2013.01); *H04N 5/341* (2013.01)

(56) References Cited

U.S. PATENT DOCUMENTS

| | | |
|---|---|---|
| 2005/0140795 A1 | 6/2005 | Hisamatsu et al. |
| 2015/0296151 A1 | 10/2015 | Dowaki et al. |
| 2017/0367673 A1* | 12/2017 | Ohishi .................. A61B 6/463 |

FOREIGN PATENT DOCUMENTS

| | | |
|---|---|---|
| JP | 2013-085241 | 5/2013 |
| JP | 2015-136461 | 7/2015 |
| JP | 2015-204522 | 11/2015 |

* cited by examiner

RADIATION IMAGING APPARATUS, DRIVING METHOD THEREFOR, AND IMAGING SYSTEM

CROSS-REFERENCE TO RELATED APPLICATIONS

This application is a Continuation of International Patent Application No. PCT/JP2016/084982, filed Nov. 25, 2016, which claims the benefit of Japanese Patent Application No. 2016-023980, filed Feb. 10, 2016, both of which are hereby incorporated by reference herein in their entirety.

BACKGROUND OF THE INVENTION

Field of the Invention

The present invention relates to a radiation imaging apparatus, a driving method therefore, and an imaging system.

Background Art

A radiation imaging apparatus includes, for example, a pixel array having an array of a plurality of pixels for detecting radiation (X-rays or the like) and a processing unit that obtains image data by processing pixel signals respectively read out from a plurality of pixels. This apparatus is used for imaging diagnosis (X-ray photography), non-destructive inspection, or the like.

Some radiation imaging apparatus is configured to perform radiation imaging by the photon counting scheme of detecting each radiation photon entering the pixel array and counting the number of incident photons (see PTL 1). More specifically, when radiation photons enter the pixel array, the pixels of the pixel array which correspond to the incident positions of the radiation photons output pixel signals corresponding to the energy amounts of the radiation photons. The processing unit reads out a group of pixel signals from a plurality of pixels as one (corresponding to one frame) pixel data in a predetermined cycle to obtain pixel data corresponding to a plurality of frames. Thereafter, the processing unit generates data for a radiation image based on the pixel data of the plurality of frames.

A pixel signal can contain a noise component having temperature dependence in addition to a signal component based on a radiation photon. In this case, the temperature of the radiation imaging apparatus (in particular, the pixel array) can change while pixel data corresponding to a plurality of frames are obtained (image data are read out in a predetermined cycle) by the above method. When the temperature changes, noise components change. This can be a cause of deterioration in the quality of an image.

There is conceivable a method of properly removing noise components that have changed with the above-described changes in temperature by obtaining correction data while image data corresponding to a plurality of frames are obtained (that is, before or after pixel data corresponding to the respective frames are obtained). Such correction data is, for example, pixel data read out from the pixel array without irradiation with radiation and substantially containing no signal component, and is also called offset data, dark image data, FPN image data, or the like. For example, it is possible to remove noise components from the pixel data of each frame by correcting the pixel data of each frame using correction data obtained immediately before or after the obtaining of the pixel data. However, this method needs to obtain a large amount of data and hence requires a long photographing time.

It is an object of the present invention to provide a technique advantageous in shortening the photographing time while maintaining the quality of an image in an arrangement configured to perform radiography based on the photon counting scheme.

CITATION LIST

Patent Literature

PTL 1: Japanese Patent Laid-Open No. 2003-279411

SUMMARY OF THE INVENTION

One aspect of the present invention is associated with a radiation imaging apparatus. The radiation imaging apparatus, comprising a pixel array in which a plurality of pixels are arrayed and a processing unit, each of the plurality of pixels including a detection element configured to detect a radiation photon, a holding unit configured to hold a voltage that changes in accordance with a radiation photon detected by the detection element, and an output unit configured to output the voltage held by the holding unit as a pixel signal, wherein when no new radiation photon is detected by the detection element after the output unit outputs a pixel signal, the voltage in the holding unit is held without any change from the voltage when the pixel signal is output, and the processing unit performs a first process of obtaining image data of a plurality of frames by repeatedly reading out image data while the pixel array is irradiated with radiation, with a group of pixel signals non-destructively read out from the plurality of pixels corresponding to image data of one frame, and a second process of generating data for a radiation image based on at least one of a number and energy amounts of radiation photons entering the pixel array which are based on data differences between the image data of the plurality of frames, and incident positions of the radiation photons in the pixel array.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DESCRIPTION OF THE EMBODIMENTS

Figure 1:
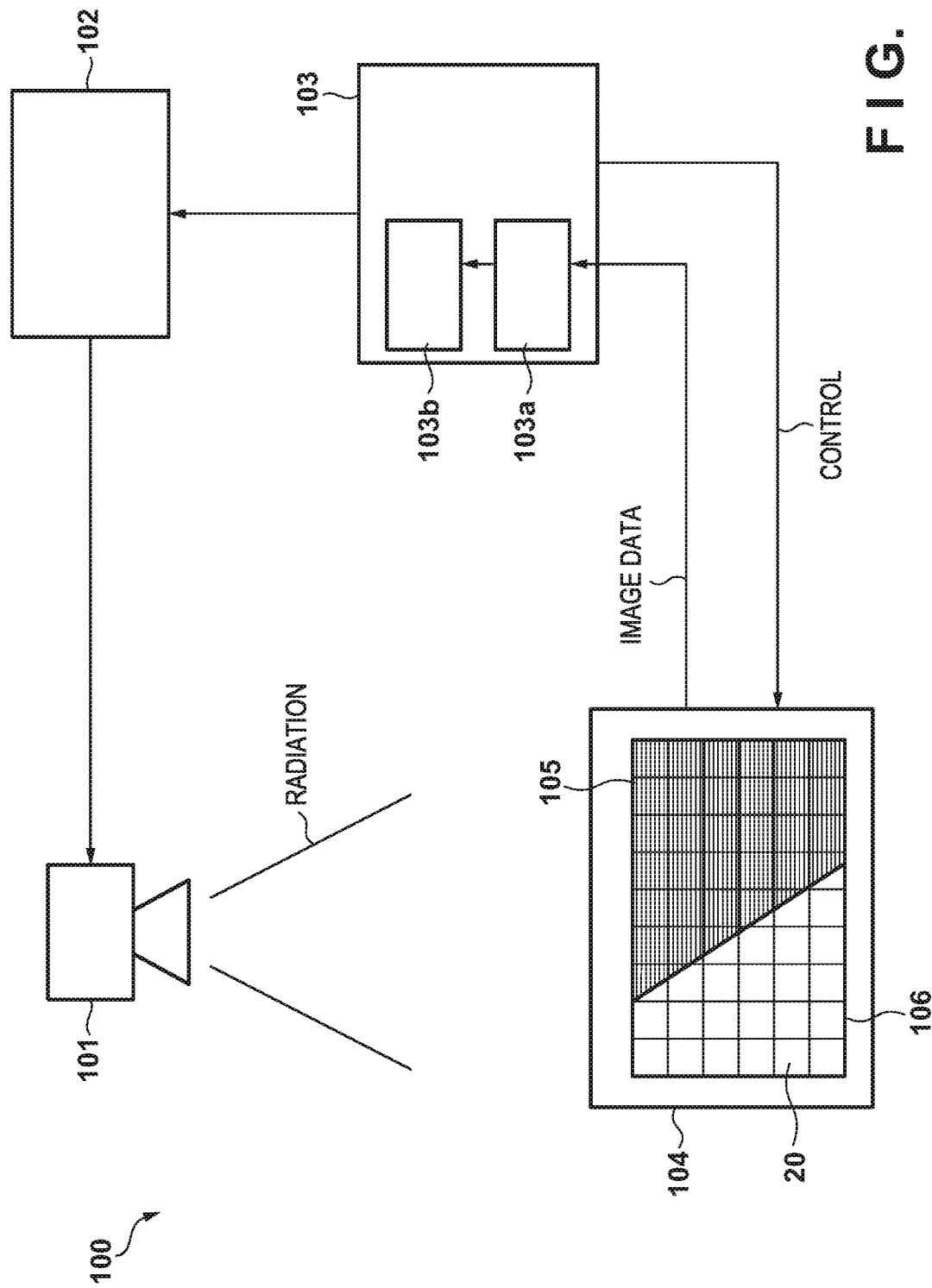
FIG. 1 is a block diagram for explaining an example of the arrangement of an imaging system.

The preferred embodiments of the present invention will be described below with reference to the accompanying drawings. Note that the respective drawings are merely illustrated for the purpose of describing structures or configurations, and the dimensions of the illustrated respective elements do not necessarily reflect actual dimensions. In addition, the same reference numerals denote the same elements in the respective drawings, and a repetitive description will be omitted.

FIG. 1 is a block diagram showing an example of the arrangement of an imaging system 100 for diagnosis, inspection, and the like using radiation (X-rays as typical radiation or a-rays, beta-rays, or the like as alternative radiation). The imaging system 100 is a radiation imaging apparatus for performing radiography by using the photon counting scheme, and includes, for example, a radiation source 101, a radiation source control unit 102, a processing unit 103, and an imaging unit 104.

The imaging unit 104 includes, for example, a scintillator 105 that converts radiation into light and a pixel array 106 having a plurality of pixels 20 arrayed in a matrix. More specifically, the plurality of pixels 20 that detect light (scintillation light) from the scintillator 105 are arrayed in the pixel array 106 so as to form a plurality of rows and a plurality of columns. Each pixel 20 may be called the "sensor", and the pixel array 106 may be called a "sensor array". Although the following will exemplify an indirect detection scheme of converting radiation into light and detecting the light, it is possible to use a direct detection scheme of directly detecting radiation.

The processing unit 103 performs radiography by controlling, for example, the imaging unit 104 and the radiation source control unit 102. The processing unit 103 controls the radiation source control unit 102 to start irradiation with radiation upon receiving a signal indicating permission to start irradiation with radiation from the imaging unit 104. The processing unit 103 receives image data (or a group of pixel signals forming image data) based on radiation applied from the imaging unit 104. The processing unit 103 calculates the number of radiation photons (to be simply referred to as "photons" hereinafter in this specification) entering the pixel array 106 and the incident positions of the photons in the pixel array 106 based on the image data. The processing unit 103 generates data for displaying a radiation image on a display unit (not shown) such as a display based on the calculation results. Although described in detail later, the processing unit 103 includes a first arithmetic unit 103a and a second arithmetic unit 103b, and performs arithmetic processing for generating the data by using these units. The processing unit 103 may further perform predetermined correction processing for the data.

The processing unit 103 may also have a function as a driving unit that drives the respective units described above and the respective elements constituting the units while performing synchronization control. Alternatively, the driving unit may be arranged independently of the processing unit 103. The processing unit 103 may be a computer including a CPU and a memory. For example, the processing unit 103 may be a personal computer storing programs or software for implementing each operation described in this specification. Alternatively, the processing unit 103 may be an arithmetic device including a dedicated integrated circuit (for example, an ASIC) for implementing this operation. That is, the function of the processing unit 103 may be implemented by hardware and/or software.

The arrangement of the imaging system 100 is not limited to the example described above. Part of the function of a given unit may be assigned to another unit, and several units may be integrated into one unit. For example, although the above description has exemplified the arrangement in which the processing unit 103 and the imaging unit 104 are separately arranged, these units may be implemented by a single unit. In addition, the above description has exemplified the arrangement in which the radiation source control unit 102 and the processing unit 103 are separately arranged, these units may be implemented by a single unit.

Figure 2:
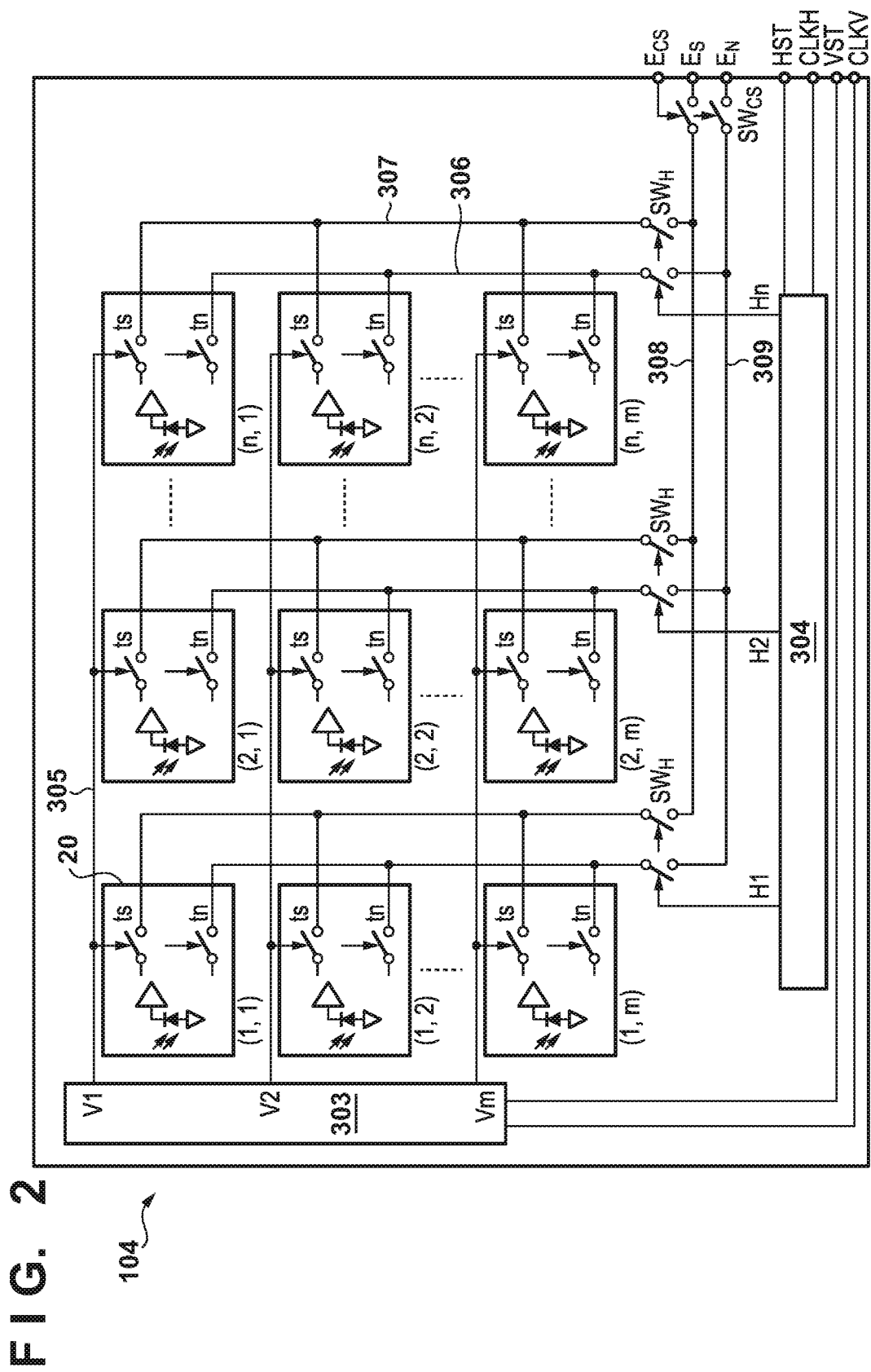
FIG. 2 is a block diagram for explaining an example of the arrangement of an imaging unit.

FIG. 2 is a block diagram showing an example of the arrangement of the imaging unit 104. The imaging unit 104 includes, for example, the plurality of pixels 20 constituting the pixel array 106, a vertical scanning circuit 303 that drives each pixel 20, and a horizontal scanning circuit 304 that performs horizontal transfer to output signals from the respective pixels 20 to the outside. The plurality of pixels 20 are arrayed in m rows×n columns. FIG. 2 shows information indicating each pixel position. For example, FIG. 2 shows (2, 1) at the pixel on the first row and the second column as information indicating a pixel position.

Although described in detail later, a signal (N signal) equivalent to a noise component in each pixel 20 is non-destructively read out from the pixel 20, together with a signal (S signal) containing both a signal component accompanying the entering of a photon on the pixel 20 and the noise component. The signal component indicates a level equivalent to the energy amount of the incident photon. This signal component is obtained by calculating the difference between the S signal and the N signal. the N signal and the S signal can be independently output from a terminal tn and a terminal ts shown in each pixel 20.

The vertical scanning circuit 303 and the horizontal scanning circuit 304 constitute, for example, a shift register, and operates based on predetermined reference signals (for example, a clock signal, a driving signal from the processing unit 103, and the like). For example, the vertical scanning circuit 303 corresponds to a driving unit that inputs a control signal to each pixel 20 via a control line 305 and drives the respective pixels 20 for each row based on the control signals. That is, the vertical scanning circuit 303 functions as a row selection unit, and selects the pixels 20 as signal readout targets for each row. In addition, the horizontal scanning circuit 304 functions as a column selection unit. The horizontal scanning circuit 304 selects the respective pixels 20 for each column based on control signals, and sequentially outputs (horizontal transfer) signals from the selected pixels 20.

The imaging unit 104 can have a terminal ES and a terminal EN for reading out an S signal and an N signal from each pixel 20. The imaging unit 104 can further have a select terminal ECS. Activating a signal received by the terminal ECS can read out the S signal and the N signal from each pixel 20 via the terminals ES and EN. More specifically, each terminal ts and each terminal tn are respectively connected to column signal lines 306 and 307. The column signal lines 306 and 307 are respectively connected to analog output signals 308 and 309 via a switch SWH that is set in a conducting state in response to a control signal from the horizontal scanning circuit 304. Signals from the analog output signals 308 and 309 are respectively output as the S signal and the N signal from the terminals ES and EN via a switch SWCS that is set in a conducting state in response to a signal received by the terminal ECS.

The imaging unit 104 further includes terminals HST, CLKH, VST, and CLKV that receive the respective control signals for controlling the vertical scanning circuit 303 and the horizontal scanning circuit 304. The terminal HST receives a start pulse input to the horizontal scanning circuit 304. The terminal CLKH receives a clock signal input to the horizontal scanning circuit 304. The terminal VST receives a start pulse input to the vertical scanning circuit 303. The terminal CLKV receives a clock signal input to the vertical scanning circuit 303.

Figure 3:
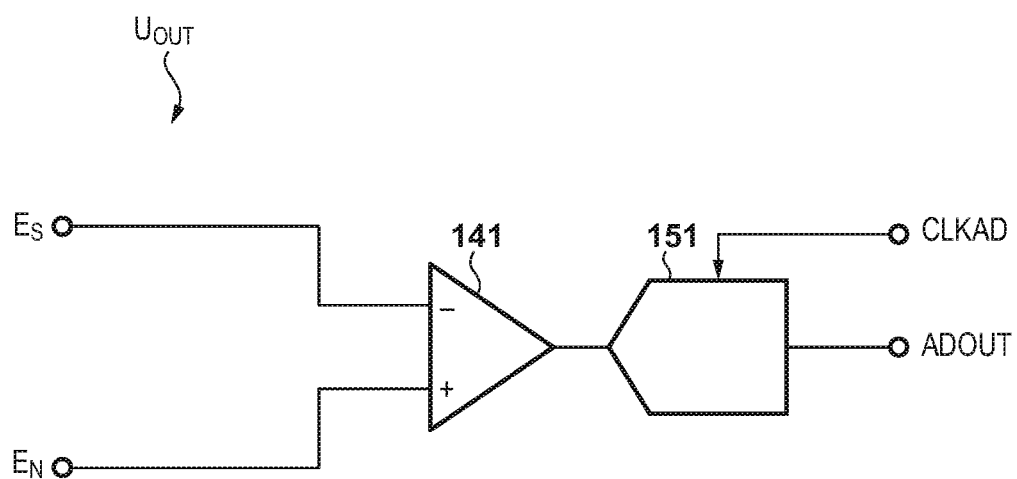
FIG. 3 is a block diagram for explaining an example of the arrangement of a signal output unit.

FIG. 3 is a view for explaining a signal output unit $U_{OUT}$. The signal output unit $U_{OUT}$ can be included in the imaging unit 104, and can include a differential amplification unit 107 and an analog/digital conversion unit 151 (to be written as an "AD conversion unit" hereinafter). The differential amplification unit 107 receives the N signal and the S signal via the terminals EN and ES. More specifically, the S signal is input to the inverting input terminal of the differential amplification unit 107. The N signal is input to the non-inverting input terminal of the differential amplification unit 107. The differential amplification unit 107 amplifies the difference between the N signal and the S signal. The AD conversion unit 151 performs analog/digital conversion (AD conversion) of the amplified difference based on a clock signal input via a terminal CLKAD. With this arrangement, noise components are removed, and each of a group of pixel signals constituting image data is obtained. The image data is output via a terminal ADOUT.

Figure 4:
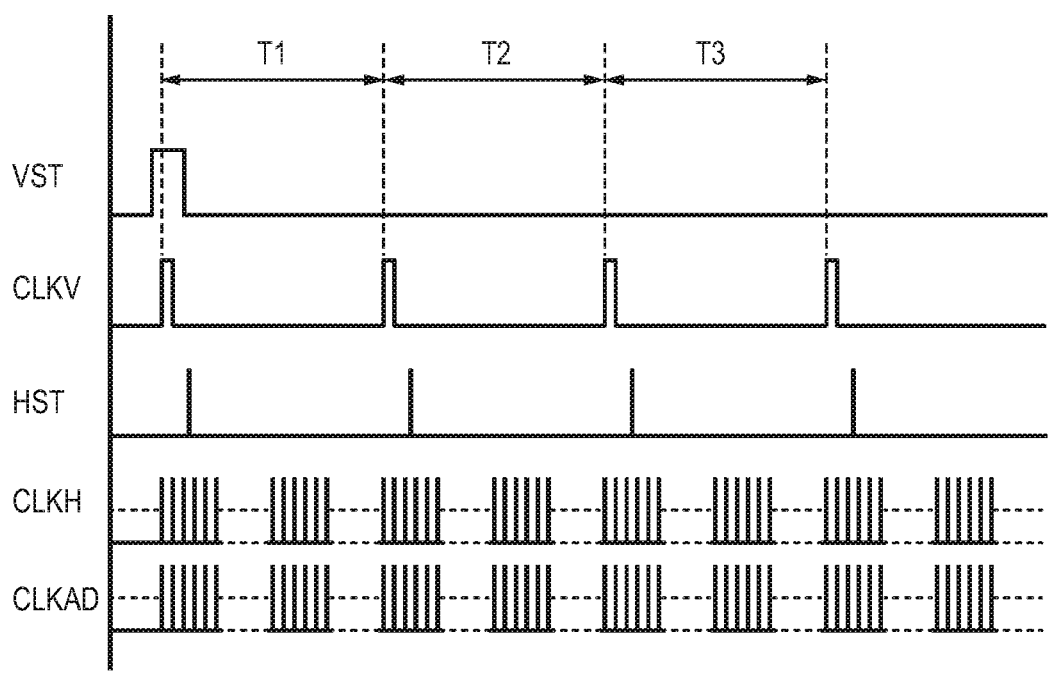
FIG. 4 is a timing chart for explaining an example of a driving method for the imaging unit.

FIG. 4 shows a timing chart for performing an image data readout operation (to be referred to as "readout operation RO" in this specification). The respective control signals (VST, CLKV, HST, CLKH, and CLKAD) indicated along the ordinate in FIG. 4 are control signals input to the respective terminals. For example, the control signal VST indicates a control signal input to the terminal VST (the same applies to the remaining control signals).

The signal VST is a start pulse signal. In accordance with this signal, the vertical scanning circuit 303 selects each pixel 20 on the first row. The signal CLKV is a clock signal. Every time the terminal CLKV receives the clock signal, the selected row is sequentially shifted from the first row to the mth row (that is, the respective pixels 20 are sequentially selected for each row from the first row to the mth row). The signal HST is a start pulse signal. Every time the terminal HST receives the start pulse signal, the horizontal scanning circuit 304 selects each pixel 20 on the first column. The signal CLKH is a clock signal. Every time the terminal CLKH receives the clock signal, the selected column is sequentially shifted from the first column to the nth column (that is, the respective pixels 20 are sequentially selected for each row from the first column to the nth column). The signal CLKAD is a clock signal. Every time the terminal CLKAD receives the clock signal, the AD conversion unit 151 described above performs AD conversion.

In a first period T1, first of all, high-level (H-level) pulses of the signals VST and CLKV are supplied to set the respective pixels 20 on the first row in a selected state. An H-level pulse of the signal HST is then supplied (that is, the pixels 20 on the first column are selected), and the first column to the nth column are sequentially selected based on the clock signals CLKH and CLKAD. With this operation, pixel signals are sequentially read out from the respective pixels 20 on the first row from the first column to the nth column.

In a second period T2, an H-level pulse of the signal CLKV is supplied to set the respective pixels 20 on the second row in a selected state. As in the period T1, an H-level pulse of the signal HST is then supplied (that is, the pixels 20 on the first column are selected), and the first column to the nth column are sequentially selected based on the clock signals CLKH and CLKAD. With this operation, pixel signals are sequentially read out from the respective pixels 20 on the second row from the first column to the nth column.

In a third period T3, pixel signals are sequentially read out from the respective pixels 20 on the third row from the first column to the nth column in the same manner as described above. The same applies to the fourth and subsequent periods (not shown). In this manner, pixel signals are read out from all the pixels 20 (pixels 20 on m rows×pixels 20 on n columns), and image data corresponding to one frame is formed based on the read pixel signals.

Figure 5:
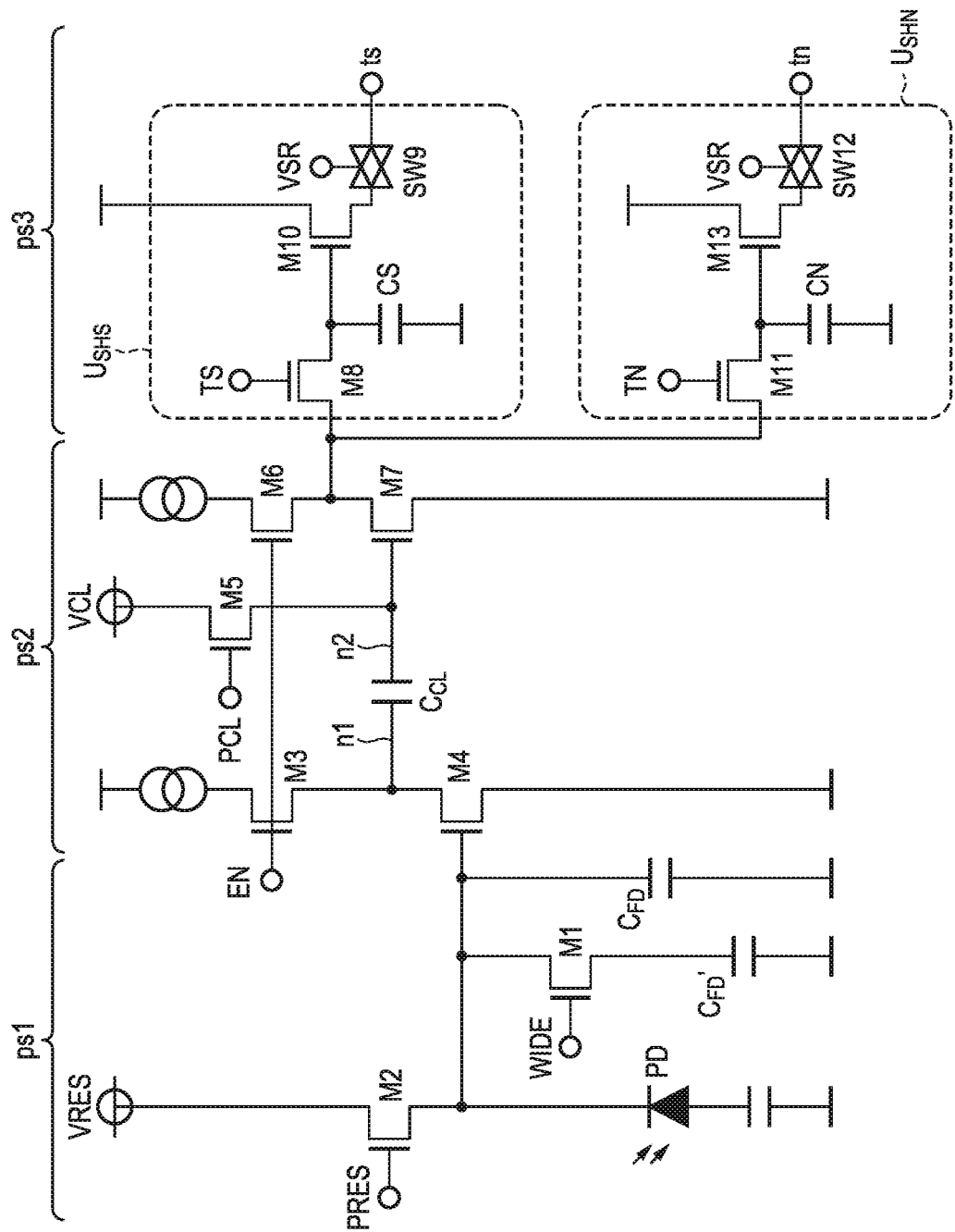
FIG. 5 is a block diagram for explaining an example of the arrangement of a unit pixel.

FIG. 5 is an equivalent circuit diagram of the unit pixel 20. The pixel 20 can include, for example, a first portion ps1, a second portion ps2, and a third portion ps3. The first portion ps1 can include a photodiode PD, transistors M1 and M2, a floating diffusion capacitor $C_{FD}$ (to be referred to as an FD capacitor $C_{FD}$ hereinafter), and a capacitor $C_{FD}'$ for sensitivity switching. The photodiode PD is a photoelectric conversion element, which detects a photon entering the pixel 20 based on light (scintillation light) generated from the photon by the scintillator 105 (see FIG. 1) and converts the light into an electrical signal. From this point of view, the photodiode PD forms, together with the scintillator 105, a detection element for detecting radiation. That is, the photodiode PD generates charges of an amount corresponding to the light amount of scintillation light, and the voltage of the FD capacitor $C_{FD}$ which corresponds to the generated charge amount is output to the second portion ps2.

The capacitor $C_{FD}'$ for sensitivity switching is used to switch the sensitivity of the pixel 20 to radiation, and is connected to the photodiode PD via the transistor M1. When a signal WIDE is activated, the transistor M1 is set in a conducting state, and the voltage of the synthetic capacitor of the FD capacitor $C_{FD}$ and capacitor $C_{FD}'$ is output to the second portion ps2. The pixel 20 is set in a low-sensitivity mode when the signal WIDE is at Hi level, and is set in a high-sensitivity mode when the signal WIDE is at Low level. As described above, the pixel 20 can change its sensitivity to radiation depending on whether the capacitor $C_{FD}'$ is used.

The transistor M2 initializes the charges in the photodiode PD when a signal PRES is activated, and resets the voltage output to the second portion ps2.

The second portion ps2 can include transistors M3 to M7, a clamp capacitor $C_{CL}$, and a constant current source. The transistor M3, the transistor M4, and the constant current source (for example, a transistor having a current mirror arrangement) are connected in series so as to form a current path. When an enable signal EN input to the gate of the transistor M3 is activated, the transistor M4 that receives a voltage from the first portion ps1 is set in an operating state. A source follower circuit is formed in this manner, and outputs a voltage corresponding to a voltage from the first portion ps1.

A clamp circuit constituted by the transistors M5 to M7 and the clamp capacitor $C_{CL}$ is provided on the output stage of the source follower circuit. More specifically, a terminal n1 as one terminal of the clamp capacitor $C_{CL}$ is connected to the node between the transistor M3 and the transistor M4 of the first portion ps1, and a terminal n2 as the other terminal is connected to the transistor M5 functioning as a clamp switch. In addition, the transistor M6, the transistor M7, and the constant current source are connected in series so as to form a current path. The other terminal n2 is connected to the gate of the transistor M7. With this arrangement, the kTC noise (so-called reset noise) generated in the photodiode PD of the first portion ps1 is removed.

More specifically, a voltage corresponding to a voltage from the first portion ps1 at the reset time described above is input to the terminal n1 of the clamp capacitor $C_{CL}$. In addition, when a clamp signal PCL is activated, the transistor M5 is set in a conducting state, and a clamp voltage VCL is input to the terminal n2 of the clamp capacitor $C_{CL}$. The potential difference generated between the two terminals n1 and n2 of the clamp capacitor $C_{CL}$ in this manner is clamped as a noise component. Thereafter, a change in voltage accompanying the generation and accumulation of charges in the photodiode PD is output as a signal component.

The enable signal EN is also input to the gate of the transistor M6 and is activated to set the transistor M7 in an operating state. In this manner, a source follower circuit is formed, and a voltage corresponding to the gate voltage of the transistor M7 is output to the third portion ps3.

The third portion ps3 can include transistors M8, M10, M11, and M13, analog switches SW9 and SW12, and capacitors CS and CN. A unit constituted by the transistors M8 and M10, the analog switch SW9, and the capacitor CS will be referred to as a "first unit $U_{SHS}$".

In the first unit $U_{SHS}$, the transistor M8 and the capacitor CS constitute a sample hold circuit, which functions as a holding unit that holds an output value from the second portion ps2. More specifically, switching the state (conducting state or non-conducting state) of the transistor M8 by using a control signal TS makes the capacitor CS hold a signal (a signal based on the light amount of scintillation light) obtained from the second portion ps2. The transistor M10 functions as an amplifier based on the source follower operation to amplify the signal. When the analog switch SW9 is set in a conducting state by using a control signal VSR, the amplified signal is output as the S signal described above from the terminal ts.

Like the first unit $U_{SHS}$, the transistors M11 and M13, the analog switch SW12, and the capacitor CN constitute a "second unit $U_{SHN}$" that outputs a signal from the terminal tn. The second unit $U_{SHN}$ holds the N signal described above (a voltage corresponding to the signal) in the capacitor CN. Likewise, the N signal is output from the terminal tn by setting the analog switch SW12 in a conducting state.

In brief, a voltage based on the amount of charges generated by each pixel 20 is held in the capacitor CS, and the voltage based on the charge amount is read out as the S signal at an arbitrary timing. The voltage based on the charge amount is kept held in the capacitor CS and is not eliminated by reading the S signal described above. In other words, the S signal is read out from the first unit $U_{SHS}$ by non-destructive reading. Likewise, the N signal is read out from the second unit $U_{SHN}$ by non-destructive reading. From this point of view, the vertical scanning circuit 303 that controls the units $U_{SHS}$ and $U_{SHN}$ forms part of a readout unit for reading out pixel signals. Thereafter, the above signal output unit $U_{OUT}$ (see FIG. 3) obtains the difference between the S signal and the N signal to eliminate a noise component originating from thermal noise, 1/f noise, a temperature difference, process variation, or the like, thereby obtaining a pixel signal.

A group of pixel signals are obtained by non-destructive reading, and image data is formed based on these signals. That is, each pixel signal is obtained from the pixel 20 at a corresponding pixel position in the pixel array 106. A group of pixel signals read out from the plurality of pixels 20 in this manner form image data corresponding to one frame. In the following description, the above series of operations for obtaining image data corresponding to one frame will be sometimes referred to as "readout operation RO".

Figure 6A:
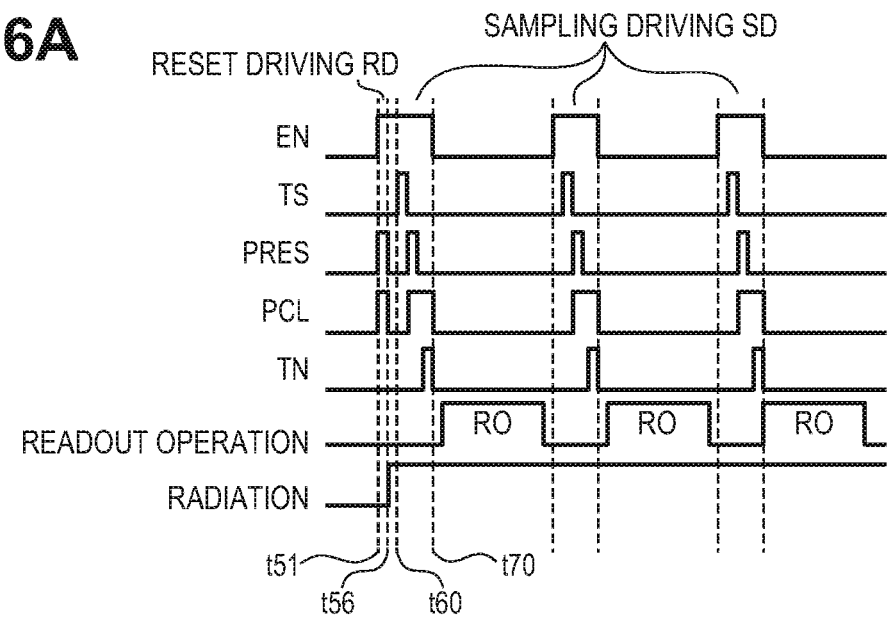
FIG. 6A is a timing chart for explaining an example of a driving method for a unit pixel.
Figure 6B:
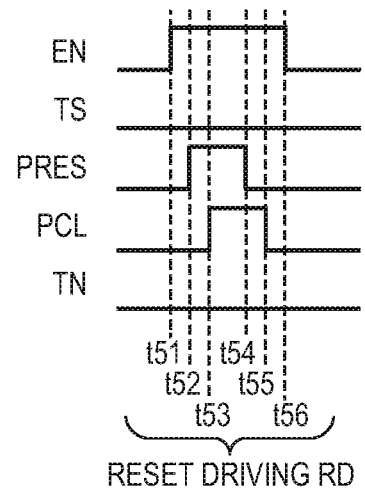
FIG. 6B is a timing chart for explaining an example of the driving method for a unit pixel.
Figure 6C:
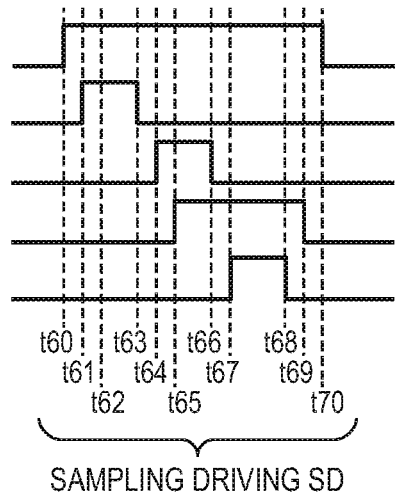
FIG. 6C is a timing chart for explaining an example of the driving method for a unit pixel.

FIGS. 6A to 6C are timing charts for explaining an example of a driving method for the unit pixel 20 according to this embodiment. Referring to FIGS. 6A to 6C, H level in "readout operation" indicates that readout operation RO is executed. In addition, referring to FIGS. 6A to 6C, H level in "radiation" indicates that radiation is applied. The intensity of the radiation (the irradiation dose per unit time) can be set to a relatively low dose (more specifically, a dose that inhibits two or more photons from entering one pixel 20 while image data corresponding to one frame is obtained) when radiography based on the photon counting scheme is performed.

As shown in FIG. 6A, reset driving RD is performed before the pixel array 106 is irradiated with radiation. FIG. 6B is an enlarged view of the timing chart for explaining reset driving RD. Reset driving RD can be repeatedly executed, for example, in a predetermined cycle before the start of irradiation with radiation. Thereafter, in response to the start of irradiation with radiation, sampling driving SD and readout operation RO can be repeatedly executed. FIG. 6C is an enlarged view of the timing chart for explaining sampling driving SD in more detail.

In the interval from time t51 to time t56, reset driving RD is performed to reset each pixel 20. More specifically, at time t51, the enable signal EN is set at H level to set the transistors M3 and M6 in a conducting state. This makes the transistors M4 and M7 perform a source follower operation.

At time t52, the signal PRES is set at H level to set the reset transistor M2 in a conducting state. This connects the photodiode PD to a reference voltage VRES to reset the photodiode PD and also reset the voltage of the capacitor $C_{FD}$. In addition, a voltage corresponding to the gate voltage of the transistor M4 immediately after the reset operation is input to the terminal n1 (the terminal on the transistor M4 side) of the clamp capacitor $C_{CL}$. Note that in the low-sensitivity mode, the signal WIDE may be set at H level at time t52 to set the transistor M1 for sensitivity switching in a conducting state and reset the voltage of the capacitor $C_{FD}$'.

At time t53, the signal PCL is set at H level to set the transistor M5 in a conducting state to perform the above clamping operation. With this operation, the clamp voltage VCL is input to the terminal n2 (the terminal on the transistor M7 side) of the clamp capacitor $C_{CL}$. At time t53, signals TS and TN may be set at H level to set the transistors M8 and M11 for performing the above sampling operation in a conducting state and initialize the capacitors CS and CN.

At time t54, the signal PRES is set at L level to set the transistor M2 in a non-conducting state. As a result, the terminal n1 of the clamp capacitor $C_{CL}$ is set to a voltage corresponding to the gate voltage of the transistor M4 immediately after the reset operation. In the low-sensitivity mode, the signal WIDE is set at L level to set the transistor M1 in a non-conducting state. This fixes the capacitor $C_{FD}'$ to a voltage immediately after the reset operation.

At time t55, the signal PCL is set at L level to set the transistor M5 in a non-conducting state. This causes the clamp capacitor $C_{CL}$ to hold charges corresponding to the potential difference (the potential difference between a voltage based on the reference voltage VRES and the reference voltage VCL) between the terminal n1 and the terminal n2, thereby completing clamping of the above kTC noise. When the capacitors CS and CN are initialized at time t53, the signals TS and TN are set at L level at time t55 to set the transistors M8 and M11 in a non-conducting state. This fixes the voltages of the capacitors CS and CN.

At time 56, the enable signal EN is set at L level to set the transistors M3 and M6 in a non-conducting state. This sets the transistors M4 and M7 in a non-conducting state. Thereafter, a signal for permitting the start of irradiation with radiation is set at active level (in a permitted state). When irradiation with radiation starts, the photodiode PD generates and accumulates charges corresponding to the dose of radiation applied.

In the above manner, a series of operations in reset driving RD is completed. That is, in reset driving RD, the photodiode PD is reset, and the clamp capacitor $C_{CL}$ holds a voltage equivalent to kTC noise originated from the photodiode PD of the first portion ps1. In addition, the capacitors CS and CN are initialized as needed.

In the interval from time t60 to time t70, sampling driving SD is performed to sample the S signal and the N signal at each pixel 20. More specifically, the capacitor CS holds a signal level (S signal) corresponding to the charge amount of the pixel 20, and the capacitor CN holds a noise level (N signal) equivalent to fixed pattern noise such as thermal noise, 1/f noise, temperature difference, process variation, or the like dependent on the circuit arrangement of the second portion ps2.

At time t60, the enable signal EN is set at H level to set the transistors M3 and M6 in a conducting state, thereby making the transistors M4 and M7 ready for a source follower operation. The gate voltage of the transistor M4 changes in accordance with the amount of charges generated and accumulated in the photodiode PD. A voltage corresponding to the changed gate voltage is input to the terminal n1 of the clamp capacitor $C_{CL}$, and the potential of the terminal n1 changes. A change in the potential of the terminal n2 of the clamp capacitor $C_{CL}$ follows a change in the potential of the terminal n1. In this case, as described above, because a voltage equivalent to kTC noise is held in the clamp capacitor $C_{CL}$, the amount of this potential change is output as a signal component to the third portion ps3.

At time t61, the signal TS is set at H level to set the transistor M8 in a conducting state so as to make the capacitor CS hold an output voltage from the second portion ps2. That is, the voltage of the capacitor CS becomes the output voltage of the second portion ps2 (a voltage corresponding to the gate voltage of the transistor M7).

At time t62, because sampling has been started at time t61, a signal for permitting the start of irradiation with radiation is set at nonactive level (in an inhibited state).

At time t63, the signal TS is set at L level to set the transistor M8 in a non-conducting state, thereby fixing the output voltage of the second portion ps2 in the capacitor CS.

That is, in the interval from time t60 to time t63, the capacitor CS holds a signal level corresponding to the amount of charges generated in the pixel 20.

At time t64, the signal PRES is set at H level to set the reset transistor M2 in a conducting state so as to reset the voltage of the FD capacitor Cm (and the capacitor $C_{FD}'$) to the reference voltage VRES. In addition, a voltage at the terminal n1 is also set to the same state as that at time t52.

At time t65, the signal PCL is set at H level to set the transistor M5 in a conducting state, thereby inputting the clamp voltage VCL to the other terminal n2 (the terminal on the transistor M7 side) of the clamp capacitor $C_{CL}$.

At time t66, the signal PRES is set at L level to set the transistor M2 in a non-conducting state, thereby setting the terminal n1 of the clamp capacitor $C_{CL}$ to a voltage corresponding to the gate voltage of the transistor M4 immediately after the resetting operation. Note that in the low-sensitivity mode, the signal WIDE is set at L level to set the transistor M1 in a non-conducting state. This can fix the capacitor $C_{FD}'$ to a voltage immediately after the resetting operation.

At time t67, the signal TN is set at H level to set the transistor M14 in a conducting state, thereby setting the voltage of the capacitor CN to the output voltage of the second portion ps2 when the gate voltage of the transistor M7 is at the reference voltage VCL.

At time t68, the signal TN is set at L level to set the transistor M14 in a non-conducting state, thereby fixing the voltage of the capacitor CN.

That is, in the interval from time t64 to time t68, the capacitor CN holds a noise level equivalent to fixed pattern noise such as thermal noise, 1/f noise, temperature difference, process variation, or the like dependent on the circuit arrangement of the second portion ps2.

Finally, at time t69, the signal PCL is set at L level to set the transistor M5 in a non-conducting state. At time t70, the enable signal EN is set at L level to set the transistors M3 and M6 in a non-conducting state (set the transistors M4 and M7 in a non-conducting state).

The series of operations in sampling driving SD is completed in the above manner. That is, in sampling driving SD, the capacitor CS holds a signal level (S signal) corresponding to the charge amount of the pixel 20, and the capacitor CN holds a noise level (N signal) equivalent to fixed pattern noise originating from second portion ps2.

Figure 7:
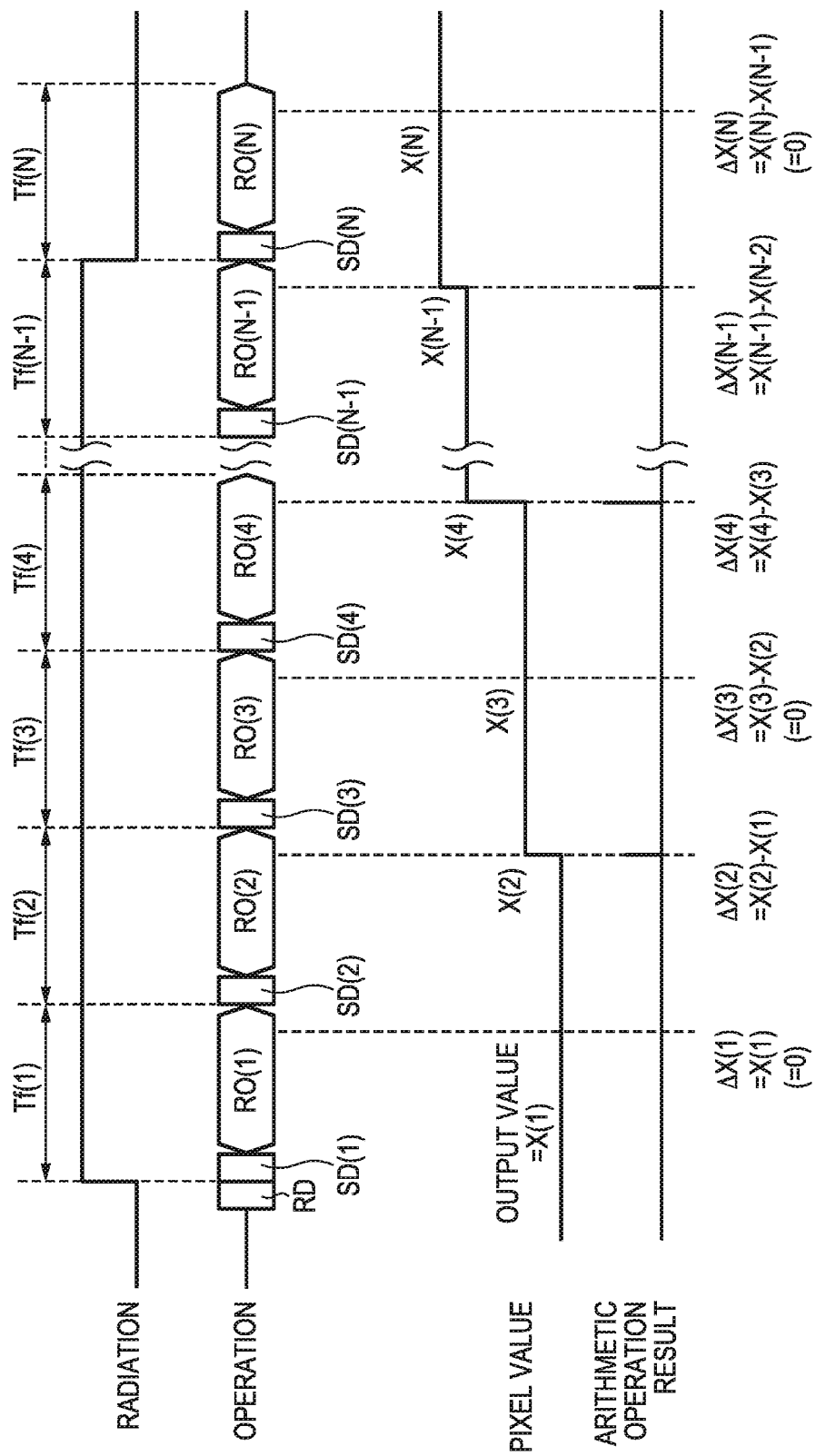
FIG. 7 is a view for explaining pixel signals constituting read image data.

FIG. 7 is a view for explaining a simplified chart of the timing chart exemplarily shown in FIG. 6A, the pixel value of a pixel signal obtained by a driving method based on the timing chart, and the result obtained by arithmetically processing the pixel value. The pixel value is the digital value of the pixel signal obtained from the single pixel 20. For the sake of simplicity, the following description will focus on the single pixel 20. However, with respect to each of other pixels 20, a pixel value can be obtained and arithmetically processed in the same manner. That is, the following arithmetic processing is performed for each of a group of pixel signals constituting image data.

As described above, the intensity of radiation (the irradiation dose per unit time) can be set to be relatively low in the photon counting scheme. For the sake of simplicity, consider a case in which, while image data corresponding to one frame is obtained, either one photon enters one pixel 20 or no photon enters the pixel 20. Assume that in the following description, two or more photons do not enter one pixel 20 while image data corresponding to one frame is obtained.

Reset driving RD is completed in accordance with the start of irradiation with radiation. Subsequently, N frames are obtained during irradiation with radiation (until detection of the end of the irradiation) in this case. Referring to FIG. 7, a period during which the kth frame is obtained will be referred to as a "period Tf(k)" (k=1 to N), and sampling driving SD and readout operation RO in the period Tf(k) will be referred to as "SD(k)" and "RO(k)".

In this case, in a period Tf(1), no photon enters the pixel 20 (no photon is detected in the pixel 20). Accordingly, a pixel value X(1) remains to be the initial value (for example, 0). In a period Tf(2), one photon enters the pixel 20, and a pixel value X(2) at this time increases from X(1) accompanying the entering of the photon. This increase is equivalent to the energy amount of one incident photon. In a period Tf(3), no photon enters the pixel 20, and a pixel value X(3) at this time remains to be equal to the pixel value X(2). In a period Tf(4), one photon enters the pixel 20, and a pixel value X(4) at this time increases from X(3) accompanying the entering of the photon. This increase is equivalent to the energy amount of one incident photon.

That is, when one photon enters the pixel 20 in the period Tf(k), the value obtained by adding an amount corresponding to the energy amount of one incident photon to a pixel value X(k-1) is obtained as a pixel value X(k). In contrast to this, when no photon enters the pixel 20 in the period Tf(k), X(k)=X(k-1).

The arithmetic operation results in FIG. 7 indicate the results obtained by calculating the pixel value differences between two consecutive frames. For example, letting ΔX(k) be the difference obtained in the period Tf(k), ΔX(k)=X(k)-X(k-1). ΔX(k) corresponds to the energy amount of one photon entering the pixel 20 in the period Tf(k).

Figure 8:
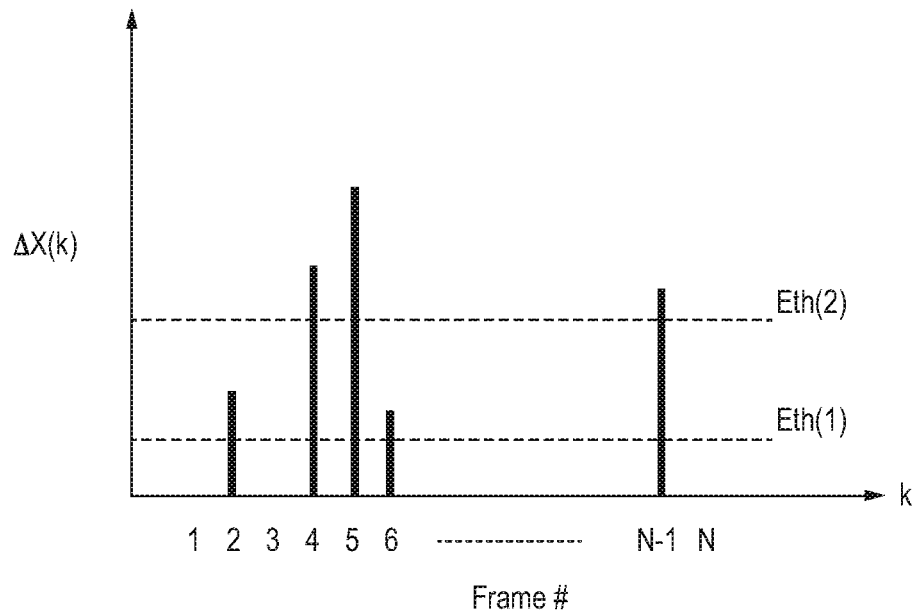
FIG. 8 is a view for explaining a processing result on read image data.

FIG. 8 is a graph showing the sums of the above arithmetic operation results for each frame, with the abscissa representing frame numbers (k=1 to N), and the ordinate representing the values of the arithmetic operation results (that is, the pixel value differences ΔX(k)). For example, the energy amount of a photon entering the pixel 20 in the period Tf(k) is calculated based on the difference ΔX(k). Note that when no photon enters the pixel 20 in the period Tf(k), difference ΔX(k)=0.

FIG. 8 shows both thresholds Eth(1) and Eth(2) as reference values for the calculation of the energy amounts of photons. In a given embodiment, when the difference ΔX(k) is smaller than the threshold Eth(1), the difference may not be used, considering that this is noise (for example, system noise). For example, the threshold Eth(1) may be set to 4a by using a standard deviation a of variations caused by noise to remove noise. The threshold Eth(1) may also be used to, for example, remove scatter components of radiation in addition to noise.

When the difference ΔX(k) is larger than the threshold Eth(2), the difference may not be used, considering that this is caused by the entering of an irregular photon. Note that the entering of the irregular photon can include the entering of a cosmic ray or the like, the entering of a photon that has not been converted into light by the scintillator 105 (so-called direct hit) or the like, and the entering of a photon other than a detection target.

In another embodiment, of the differences ΔX(1) to ΔX(N), differences falling within the range of Eth(1) to Eth(2) may be used, and differences falling outside the range may not be used. In still another embodiment, three or more thresholds Eth may be provided. This makes it possible to discriminate photons by comparing each threshold Eth with the difference ΔX(k). For example, it is possible to identify the material of an object through which a photon has passed.

For example, the arithmetic unit 103a (see FIG. 1) included in the processing unit 103 can calculate the difference ΔX(k) between two frames. In addition, for example, the arithmetic unit 103b included in the processing unit 103 can calculate the energy amount of a photon based on the difference ΔX(k). FIG. 1 exemplifies the arrangement in which these arithmetic processes are respectively implemented by the arithmetic units 103a and 103b. However, such arithmetic processes may be implemented by a single unit.

Figure 9:
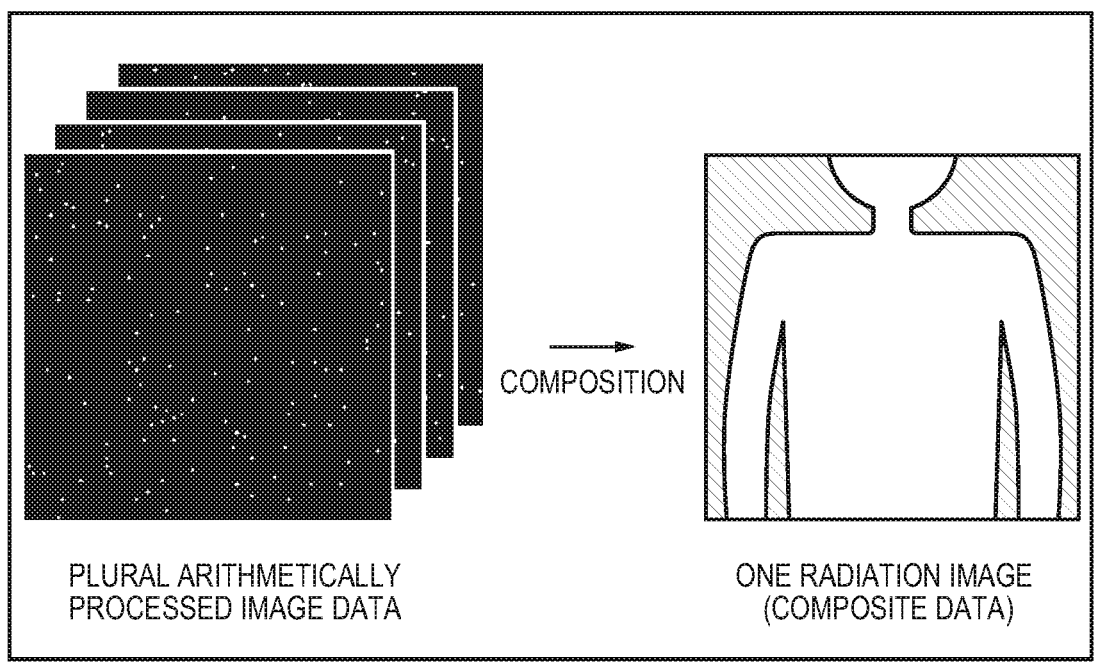
FIG. 9 is a view for explaining a method of generating data for a radiation image.

FIG. 9 is a conceptual view showing how data for one radiation image is generated based on a plurality of image data having undergone arithmetic processing following the procedure described above. That is, the plurality of image data are composed into data for one radiation image (in the following description, the data for one radiation image is sometimes referred to as the "composite data").

The white dots in each image data correspond to the differences ΔX(k) calculated by the above arithmetic processing (that is, the signal components accompanying the entering of photons on the pixels 20 in the period Tf(k) and based on the energy amounts of the photons). For example, as the difference ΔX(k) increases (that is, as the energy amount of the photon increases), the illuminance of the dot in FIG. 9 increases. In contrast to this, the black region without any white dots indicates difference ΔX(k)=0 (that is, the region where no photon has entered in the period Tf(i)).

Consider, for example, a given pixel 20. In this case, letting E(k) be the energy amount calculated based on the difference ΔX(k), the sum of energy amounts of all photons entering the pixel 20 can be represented by Σ{E(k)} (k=1 to N). In addition, letting d be the number of photons entering the pixel 20 (an integer satisfying 1≤d≤N), an average energy amount EAVG of photons entering the pixel 20 is given by EAVG=Σ{E(k)}/d. Note that when no photon has entered the pixel 20 (d=0), EAVG is substantially given as EAVG=0.

The above average energy amount EAVG is calculated for each of the plurality of pixels, and composite data can be generated based on the calculation results. Note that in this embodiment, composite data is generated by using the average energy amount EAGV. In another example, the statistical value (the average value, the median value, the mode value, or the like) of these data, or the sum Σ{E(k)} may be used without change.

According to this embodiment, for example, the time required for sampling driving SD is about 1 [msec], and the time required for readout operation RO (the time required for about 1,000 rows when the time required for one row is 10 [μsec]) is about 10 [msec]. Accordingly, the time required to obtain image data corresponding to one frame is about 11 [msec], that is, the frame rate is about 90 [FPS] (the driving speed at which 90 frames are obtained per sec).

Figure 10:
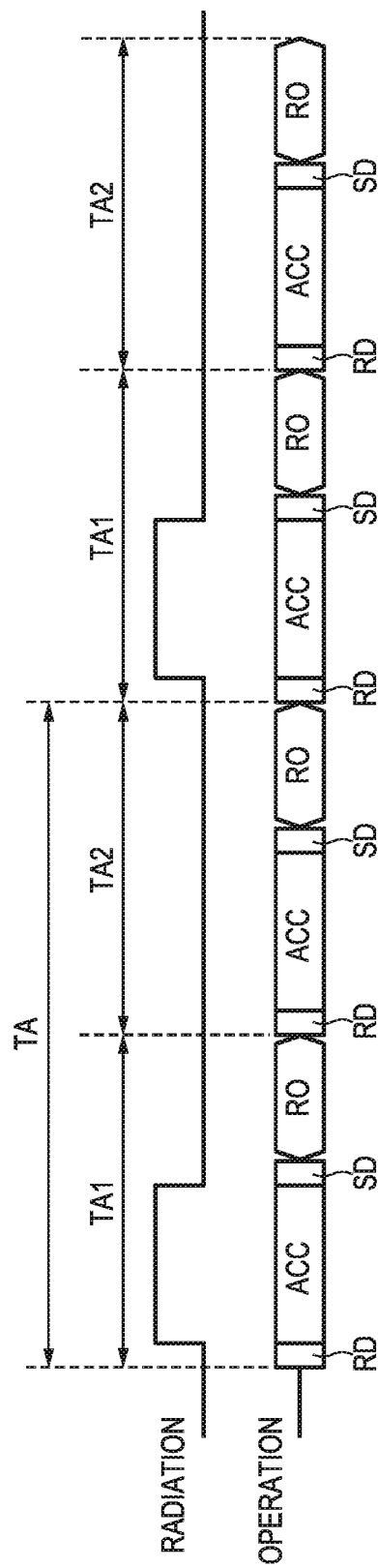
FIG. 10 is a view for explaining a reference example of a driving method for a unit pixel.

FIG. 10 is a timing chart showing, as a reference example, a case in which correction data is obtained while image data corresponding to a plurality of frames are obtained (after the image data of a given frame is obtained and before the image data of a next frame is obtained) in comparison with the case shown in FIG. 7. Correction data is image data obtained without irradiation with radiation (that is, image data substantially containing no signal component) can be called offset data, dark image data, fixed pattern noise (FPN) data, or the like.

According to the reference example, after the image data of a given frame is obtained, the image data is corrected by using correction data obtained immediately after (or immediately before) the image data is obtained. The correction is implemented by obtaining the difference between image data and correction data. More specifically, the correction is implemented by obtaining the signal value difference between each of a plurality of pixel signals constituting image data and a corresponding one of a plurality of pixel signals constituting correction data. Implementing the correction can properly remove noise originating from changes in temperature which have occurred while the image data of a plurality of frames are obtained (for example, noise that can cause and unevenness in an image). The processing unit 103 may perform this correction.

According to the reference example, reset driving RD, accumulating operation ACC of accumulating charges in each pixel 20 upon reception of radiation, sampling driving SD, and readout operation RO are sequentially performed to obtain image data corresponding to one frame. A period during which this series of operations is performed is written as a "period TA1" in FIG. 10. After the period TA1, similar operations are performed without irradiation with radiation, that is, reset driving RD, accumulating operation ACC, sampling driving SD, and readout operation RO are sequentially performed, to obtain correction data. A period during which this series of operations is written as a "period TA2" in FIG. 10. The above period TA1 and the period TA2 will be collectively referred to as a "period TA". That is, in the signal period TA, corrected image data corresponding to one frame is obtained.

According to the reference example, however, data corresponding to two frames, that is, image data obtained in the period TA1 and correction data obtained in the period TA2, are required to obtain corrected image data corresponding to one frame. Accordingly, this requires a long photographing time. For this reason, the frame rate in the reference example becomes about 20 [FPS]. When corrected image data corresponding to 4,000 frames are required to generate the composite data shown in FIG. 9, it takes as much as 200 sec at a frame rate of 20 [FPS]. In addition, according to the reference example, in order to obtain one composite data, it is necessary to repeat irradiation with radiation and non-irradiation. This leads to complexity of control of each unit.

In contrast to this, according to this embodiment, the time from given sampling driving SD to next sampling driving SD corresponds to the time of accumulating operation ACC described above. That is, there is no need to additionally provide accumulating operation ACC. In addition, no reset driving RD is performed. Consequently, according to the embodiment, image data corresponding to 4,000 frames can be obtained at a frame rate of about 90 [FPS]. That is, it is possible to shorten the photographing time to about ⅕ of that required in the reference example. Accordingly, this embodiment is advantageous in shortening the photographing time while maintaining the quality of images.

According to this embodiment, when the differences between two frames are calculated, noise that the frames can have (almost the same amount of noise that each frame has) canceled. This eliminates the necessity to additionally obtain the above correction data. That is, there is no need to repeat irradiation with radiation and non-irradiation. Therefore, the embodiment facilitate control of each unit as compared with the reference example.

The embodiment of the present invention and its modification have been described above. However, the present invention is not limited to the exemplified modes and may be changed without departing from the scope of the invention. In addition, obviously, individual terms described in this specification are merely used for the purpose of explaining the present invention, and the present invention is not limited to the strict meanings of the terms and can also incorporate their equivalents.

The present invention is advantageous in shortening the photographing time while maintaining the quality of an image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A radiation imaging apparatus, comprising:
   a pixel array in which a plurality of pixels are arrayed, each of the plurality of pixels including a detection element configured to detect a radiation photon, a holding unit configured to hold a voltage that changes in accordance with a radiation photon detected by the detection element, and an output unit configured to output the voltage held by the holding unit as a pixel signal; and
   a processing unit, wherein
   when no new radiation photon is detected by the detection element after the output unit outputs a pixel signal, the voltage in the holding unit is held without any change from the voltage when the pixel signal is output, and
   the processing unit is configured to perform first and second processes, the first process comprising obtaining image data of a plurality of frames by repeatedly reading out image data while the pixel array is irradiated with radiation, with a group of pixel signals non-destructively read out from the plurality of pixels corresponding to image data of one frame, and the second process comprising generating data for a radiation image based on at least one of a number and energy amounts of radiation photons entering the pixel array which are based on data differences between the image data of the plurality of frames, and incident positions of the radiation photons in the pixel array.

2. The radiation imaging apparatus according to claim 1, wherein in the second process the processing unit calculates the number of radiation photons entering the pixel array and the incident positions of the radiation photons while image data of the two frames are obtained, based on data differences between image data of two frames consecutively obtained in the first process.

3. The radiation imaging apparatus according to claim 1, wherein in the second process the processing unit calculates signal values constituting data for a radiation image which respectively correspond to the plurality of pixels, based on at least one of the number and the energy amounts of radiation photons entering the plurality of pixels.

4. The radiation imaging apparatus according to claim 1, wherein in the second process the processing unit does not use an energy amount, of the energy amounts, which is smaller than a predetermined reference value for generation of data for a radiation image.

5. The radiation imaging apparatus according to claim 1, wherein in the second process the processing unit generates data for a radiation image by using an energy amount, of the energy amounts, which falls within a predetermined range.

6. The radiation imaging apparatus according to claim 1, further comprising a readout unit configured to respectively read out pixel signals from the plurality of pixels, wherein
the readout unit is configured to read out image data corresponding to one frame by performing an operation of respectively sampling signals from the plurality of pixels and an operation of outputting the sampled signals to the processing unit.

7. The radiation imaging apparatus according to claim 1, further comprising a driving unit configured to drive the plurality of pixels, wherein
the driving unit is configured to reset the plurality of pixels before start of irradiation of the pixel array with radiation, and does not reset the plurality of pixels while the processing unit performs the first process.

8. An imaging system, comprising a radiation imaging apparatus defined in claim 1 and a radiation source configured to generate radiation.

9. A driving method for a radiation imaging apparatus including a pixel array in which a plurality of pixels are arrayed,
each of the plurality of pixels including a detection element configured to detect a radiation photon, a holding unit configured to hold a voltage that changes in accordance with a radiation photon detected by the detection element, and an output unit configured to output the voltage held by the holding unit as a pixel signal,
wherein when no new radiation photon is detected by the detection element after the output unit outputs a pixel signal, the voltage in the holding unit is held without any change from the voltage when the pixel signal is output,
the driving method comprising:
a step of obtaining image data of a plurality of frames by repeatedly reading out image data while the pixel array is irradiated with radiation, with a group of pixel signals non-destructively read out from the plurality of pixels corresponding to image data of one frame; and
a step of generating data for a radiation image based on at least one of a number and energy amounts of radiation photons entering the pixel array which are based on data differences between the image data of the plurality of frames, and incident positions of the radiation photons in the pixel array.

10. A non-transitory computer-readable storage medium storing a program for causing a computer to drive a radiation imaging apparatus, the radiation imaging apparatus including a pixel array in which a plurality of pixels are arrayed, each of the plurality of pixels including a detection element configured to detect a radiation photon, a holding unit configured to hold a voltage that changes in accordance with a radiation photon detected by the detection element, and an output unit configured to output the voltage held by the holding unit as a pixel signal, the program causing the computer:
to obtain image data of a plurality of frames by repeatedly reading out image data while the pixel array is irradiated with radiation, with a group of pixel signals non-destructively read out from the plurality of pixels corresponding to image data of one frame; and
to generate data for a radiation image based on at least one of a number and energy amounts of radiation photons entering the pixel array which are based on data differences between the image data of the plurality of frames, and incident positions of the radiation photons in the pixel array, wherein
when no new radiation photon is detected by the detection element after the output unit outputs a pixel signal, the voltage in the holding unit is held without any change from the voltage when the pixel signal is output.

* * * * *